June 25, 1963 M. C. BURK 3,094,862
CHROMATOGRAPHIC ANALYZER PEAK READER
Filed Dec. 3, 1958 5 Sheets-Sheet 1

INVENTOR.
M.C. BURK
BY Hudson & Young
ATTORNEYS

INVENTOR.
M.C. BURK

BY Hudson & Young

ATTORNEYS

June 25, 1963  M. C. BURK  3,094,862
CHROMATOGRAPHIC ANALYZER PEAK READER
Filed Dec. 3, 1958  5 Sheets-Sheet 3

INVENTOR.
M.C. BURK
BY Hudson & Young
ATTORNEYS

June 25, 1963 M. C. BURK 3,094,862
CHROMATOGRAPHIC ANALYZER PEAK READER
Filed Dec. 3, 1958 5 Sheets-Sheet 4

INVENTOR.
M.C. BURK
BY *Hudson & Young*
ATTORNEYS

June 25, 1963   M. C. BURK   3,094,862
CHROMATOGRAPHIC ANALYZER PEAK READER
Filed Dec. 3, 1958   5 Sheets-Sheet 5
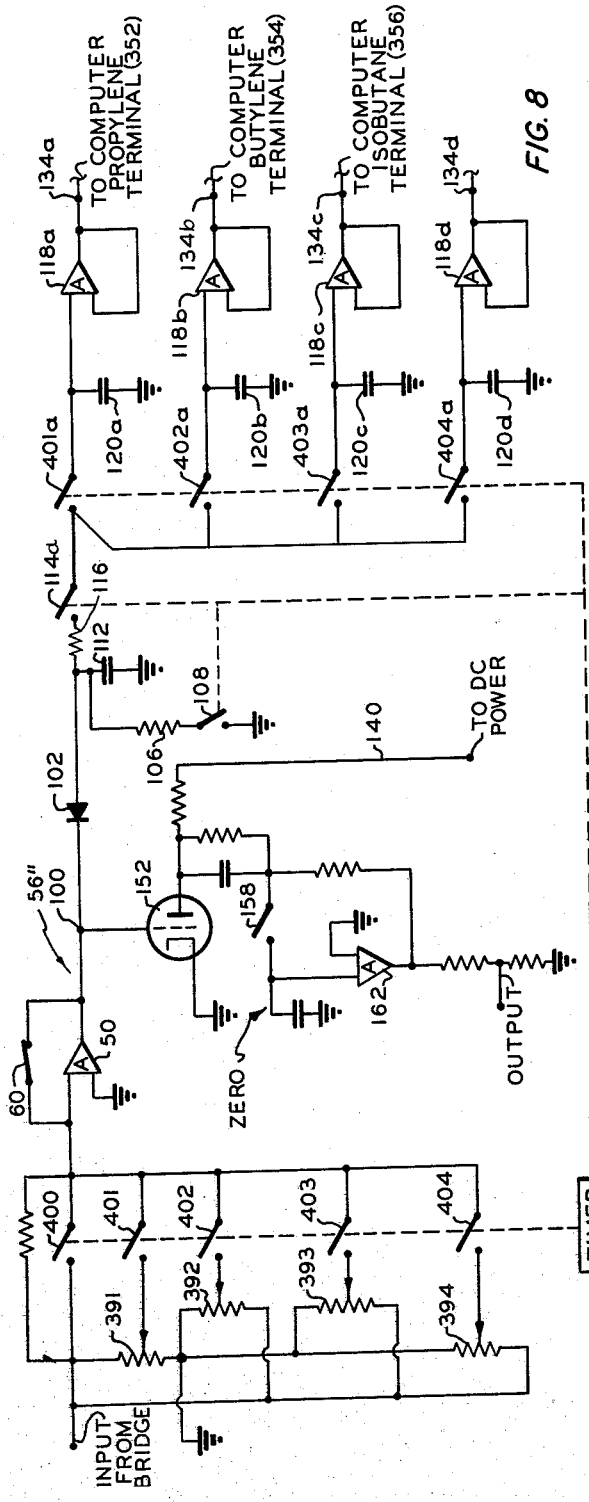
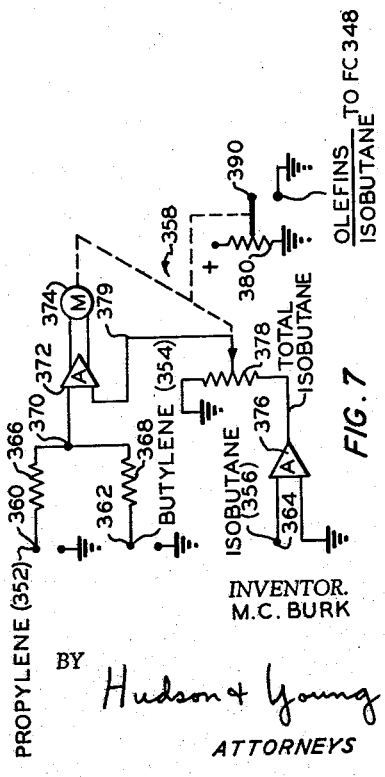
INVENTOR.
M.C. BURK
BY
Hudson & Young
ATTORNEYS United States Patent Office 3,094,862
Patented June 25, 1963

3,094,862
CHROMATOGRAPHIC ANALYZER PEAK READER
Marvin C. Burk, Bartlesville, Okla., assignor to Phillips Petroleum Company, a corporation of Delaware
Filed Dec. 3, 1958, Ser. No. 777,995
15 Claims. (Cl. 73—23)

This invention is a continuation-in-part of my copending application Serial No. 727,606, filed April 10, 1958, and entitled "Chromatographic Analyzer Peak Reader." The instant invention relates to improvements in apparatus for recording and/or controlling with the maximum values of a selected component or components of a sample stream that is passed through an analyzer. In one specific aspect, it relates to such improved apparatus suitable for rendering a gas phase chromatographic analyzer suitable for control purposes. In another specific aspect it relates to a chromatographic analyzer having an improved peak reader associated therewith which renders the former suitable for ratio control or similar operations.

In vapor phase chromatography a measured sample is placed in a packed column. This sample is then eluted by passing a carrier gas such as helium through the column. The various gases that make up the sample are eluted from the column by the carrier gas in a fixed order. When the packed column is associated with suitable measuring apparatus, such as a recorder, a series of curves will be generated by measuring the eluted gas stream. These curves consist of a series of peaks with each peak indicating a certain component (or in certain cases, two components), of the measured sample. The height of each peak indicates the concentration of the component which the peak represents. This technique means that the entire sample must be analyzed in order to determine the amount of one component therein, i.e. all of the vaporizable substances in the measured sample must be eluted from the column in order to properly analyze the sample. By appropriately selecting packing, it is possible to elute more than one gas at a time. In the following discussion it will be assumed, for the sake of clarity, that only one gas is being eluted.

It has been proposed to use such a chromatographic analyzer to control processes, especially fractionation processes. The advantage of such use, compared with other means for analyzing, is that the chromatographic analyzer can accurately determine the concentrations of certain materials in the presence of other materials, e.g., isopentane in the presence of normal and isobutanes, and propane. In effect, the equipment of the instant invention "filters" the desired signal out of a group of other signals where each signal represents a particular component in a mixture of materials. By thus discriminating, a signal which is suitable for control is obtained and the instant apparatus permits continuously producing this signal until the next analysis is made by the chromatographic analyzer. From a practical standpoint, the advantages of this type of analyzer, in addition to its suitability for particular detections, are that it is easier to install, requires less maintenance, and is far cheaper and more economical to initially purchase, than are other types such as refractometers, infrared, and ultraviolet analyzers or mass spectrometers.

If one is interested in such control, it is ordinarily desired to arrange for control from the measurement of a single component. In the case of the aforesaid series of peaks, it becomes necessary to select the one peak that indicates the concentration of the control component and to produce a signal therefrom that is representative of the maximum peak height, i.e., that is representative of the concentration determined. Equipment for doing this is termed a peak-reader. The peak readers of the instant invention and of my copending case permit doing this, selecting a single component and producing a control signal therefrom.

In the instant invention means, such as a timer, are provided to select a component or a peak during elution. The same means also times the admission of a measured sample and a carrier gas, in sequence, into a chromatographic column. In some installations, as will be hereafter described, a plurality of columns is provided and in such instances the means selects the particular column and times the admission into it. As described in my copending case, when the selected component is eluted from the column, a signal is generated and is passed to a signal storing means, such as a capacitor. When the maximum point of the peak occurs, the signal storing means prevents further application of the input signal signal to itself and maintains a charge thereon representative of this maximum point—that is, the peak. In the instant invention, this peak is then transferred to a memory circuit where it is stored and differentially amplified. Following amplification, the signal is then applied to a recorder-controller. The memory circuit, e.g. another capacitor, is employed to assure that a continuous control signal is produced from the peak reading apparatus. The instant invention employs a capacitor instead of the apparatus disclosed in my copending application because faster analyses—hence shorter cycle time and time constants—are possible.

As described in my copending application, No. 727,606, and herein, the electrical signals produced by the chromatographic analyzer are obtained from a Wheatstone bridge. This bridge has certain elements which tend to drift or become inaccurate as time goes by. The instant invention also provides a novel means of compensating for this bridge drift. The operation of correcting for drift is termed "zeroing." In the instant apparatus, means are provided to detect the bridge unbalance at a time when no peak is being read. The signal that represents the unbalance is passed to a phase inverter, to a memory circuit, and then is applied back into the bridge. The effect of this is to provide a continuous bias to the bridge which is opposite and of substantially equal magnitude to the unbalance signal produced. This automatic zeroing operation and the equipment therefor is cooperatively arranged with the peak reader proper as described in summary above and in greater detail hereinbelow.

The advantages of this cooperative arrangement are that a rugged system is obtained that has fewer precision moving parts and fewer precision elements such as potentiometers and comparing circuits. The instant invention is also designed to take advantage of new developments that permit higher speed chromatographic analyses; some of the more recent developments in the chromatographic column have provided apparatus that is capable of analyzing the sample in 3 to 5 minutes, or even less. Some of these high speed analyzers have a plurality of packed columns with suitable valving to sequentially admit samples of material to respective columns.

In some installations it has been found desirable to control by the ratio of two or more elements. One example of this is the alkylation of certain hydrocarbons by contacting a mixture thereof with hydrofluoric acid. In such cases if the ratio of components can be detected by a single analysis of a single sample stream, a chromatographic analyzer is applicable. In such case, a selecting circuit is operated by timing means to select the critical peaks and to pass the particular peaks to a peak reading means where the magnitude of the peak, represented by an electrical signal is temporarily stored. The apparatus then transfers each of the temporarily stored peaks to individual memory circuits from where they are applied to a ratio controller or computer, as the case may be. The output signal from the ratio controller or the computer is then applied to control the process variable.

Accordingly, it is an object of this invention to provide an improved peak reader. It is also an object of this invention to provide an improved peak reader having a simplified circuit. It is another object of this invention to provide a peak reader of rugged construction having a minimum amount of precision and of moving parts.

It is an object of this invention to provide an improved automatic zero apparatus for use in an automatic chromatographic analyzer. It is another object of this invention to provide an improved automatic zero apparatus which is rugged, has simplified circuitry, and has fewer moving parts. It is still a further object of this invention to provide an improved automatic zero apparatus for use in cooperation with an improved peak reader as herein described. It is still a further object of this invention to provide a peak reader capable of reading multiple peaks. Another object is to provide a multiple peak reader suitable for use in control of ratios, and the like, of process streams. An object is also to provide improved apparatus suitable for cooperating with high speed chromatographic analyzers. Other objects and advantages will become apparent from the following disclosure.

In the drawings:

FIGURE 7 shows schematically a computer suitable for use in the apparatus of FIGURE 6;

FIGURE 8 shows schematically a multiple peak reader suitable for use in the apparatus of FIGURE 6.

As used herein the term "gate" is a period of time during which the peak reader of the instant invention is in operation to produce a signal representative of the maximum value generated by selected component as it passes through the fluid handling portion of the analyzer. "Peak," for the purpose of this invention, may be defined as the maximum signal received during the gate. "Cycle time" is the period of time required to carry out a desired analysis of a particular sample. "Zero" represents the act of, and interval of time for, compensating the bridge for drift. A "memory circuit" is an apparatus to which a peak is transferred after having been read.

Figure 1:
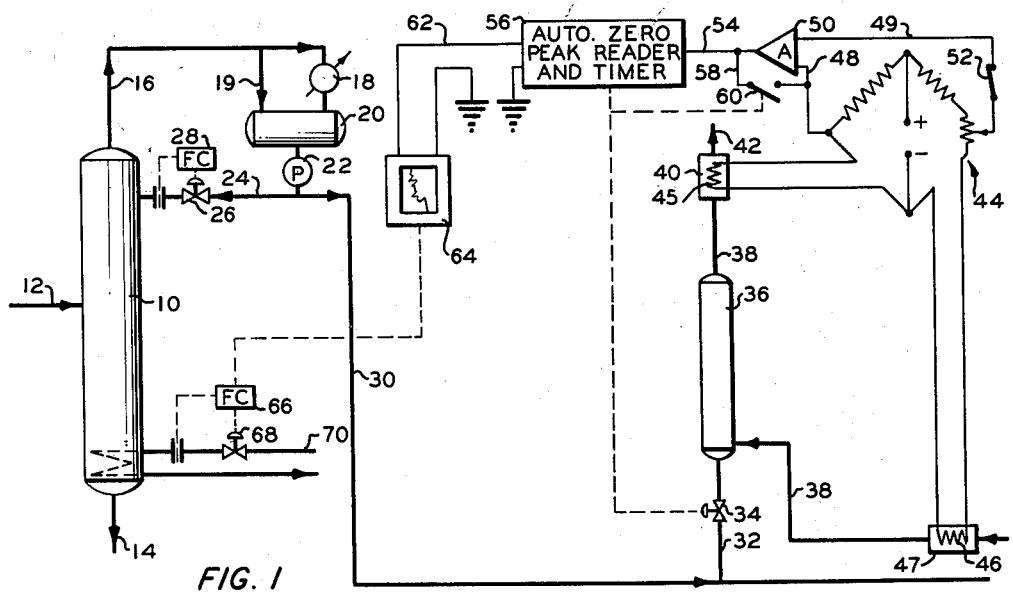
FIGURE 1 shows schematically the peak reader timer and automatic zero of the instant chromatographic analyzer as applied to the control of a fractionation unit.

FIGURE 1 shows a fractionator 10 which comprises a portion of a depropanizer. A feed of natural gas liquids, comprising propanes through nonanes, primarily, that is, $C_3$'s through $C_9$'s, is provided through conduit 12. A kettle product stream comprising $C_5$'s and heavier is withdrawn through conduit 14. An overhead line 16 conducts what is primarily propane and butane through a condenser 18 and condenser bypass 19 to an accumulator 20. A liquid pump 22 assists in pressurizing the liquid withdrawn from the accumulator. A reflux line 24 returns reflux to the column under the control of a valve 26 which is regulated by a flow controller 28. The overhead liquid product passes out through conduit 30.

A sample is withdrawn from the line 30 through a conduit 32 by means of a sampling valve 34 which is controlled by a timer. The sample passes through the valve into the chromatographic column 36 from whence it is eluted by a stream of carrier gas, such as helium, which is admitted through the conduit 38, and which may, if necessary, have a carrier gas valve (not shown) as part of the system. Such a valve would operate cooperatively with the valve 34 and be controlled by the timer. It is preferred to employ a column having a constant flow of carrier gas, which requires only a pressure regulator and/or a flow controller instead of a timer-operated valve. The gas mixture eluted from the column passes through a conduit 38 to a sample cell 40, thence is vented through 42.

A Wheatstone bridge 44 has thermistors, or other temperature sensitive elements 45 and 46, in respective branches thereof and disposed, respectively, in sample cells 40 and 47 (the latter being for obtaining a carrier gas reference signal). Leads 48 and 49 conduct the output signals from the bridge to an amplifier 50. A manually operated switch 52 is disposed in lead 49 for purposes which will be hereinafter explained with respect to FIGURE 5A.

The amplifier 50 feeds its output signal through lead 54 into the apparatus 56 designated schematically as the automatic zero, peak reader, and timer. A feedback circuit 58 having a switch 60 controlled by the timer portion of apparatus 56 is associated with the amplifier 50. The particular peak selected by and read by the peak reader is fed through the lead 62 to a recorder controller 64. In the embodiment shown, the peak reader is sensitized to read isopentane out of the mixture of hydrocarbons sent into the column 36 that appear in the overhead product stream in conduit 30. This peak is used to actuate a flapper valve, or appropriate transducing or electrical apparatus in recorder controller 64.

The signal from recorder controller 64 is transmitted by appropriate means to reset a flow controller 66 which normally controls the flow of steam or other heating medium to the fractionator. The flow controller 66 in turn adjusts the position of a control valve 68 disposed in the steam conduit 70.

Figure 2:
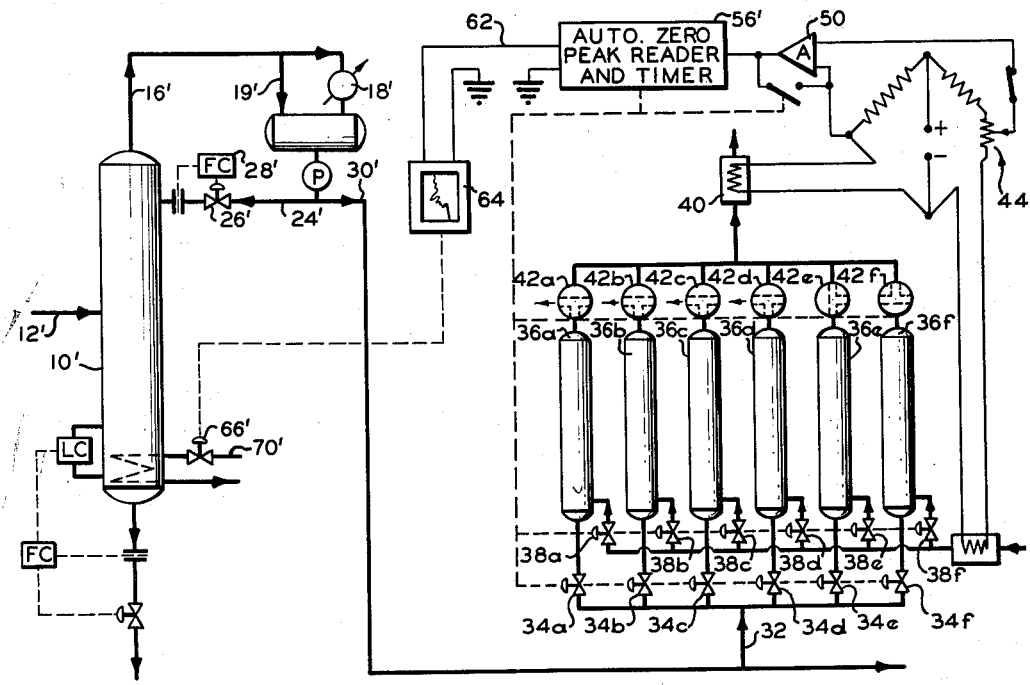
FIGURE 2 shows schematically another application of the instant invention to a chromatographic analyzer employing a plurality of packed columns in a fractionator control system.

In FIGURE 2 there is shown an application for the instant invention in association with a multiple column chromatograph. Specifically, the application is to a fractionator wherein a hydrocarbon mixture comprising ethylene, acetylenes, and ethane through nonanes are supplied through conduit 12′. Because of the similarity of the various parts of the apparatus to that of FIGURE 1, primed or alphabetical numerals are used to denote elements performing the same, or substantially the same, functions. In this separation it is desired to drive the ethylene overhead and to monitor the amount of carbon monoxide appearing in the overhead product, a typical composition of which is: ethylene 98.0%, acetylenes 1.4%, ethane 0.5% (approximately), methane 0.1% (approximately), and carbon monoxide 0–50 p.p.m. Because of the low concentration of the monoxide, large samples are taken (on the order of 700 cc. (S.T.P. of vapor), and the multiple columns 36a through 36f are used to both handle these large samples so that a large quantity of the monoxide is available for measurement, and to increase the number of analyses per unit time.

A plurality of sampling valves 34a through 34f are provided, one each between the overhead product line 30′ and the respective columns 36a through 36f. Similarly, carrier gas valves 38a through 38f and sample-or-vent valves 42a through 42f are provided to each column. The timer 56′ is adjusted to operate each of these various valves in an appropriate sequence so that the carbon monoxide peak in each column can be read.

At the instant of operation shown in FIGURE 2, columns 36a, b, c, and d are being flushed, column 36e is being eluted, and 36f is charging. This means that sampling valves 34a, b, c, d and e are closed and 34f is open. Similarly, carrier gas valves 38a, b, c, and d are adjusted to the "flush" position to admit a large flow of carrier gas to their respective columns so that materials adsorbed on column packing can be removed. Carrier gas valve 38e is held at an eluting flow position, and valve 38f is closed. Valves 42a, b, c, and d are at a position for venting, valve 42e is positioned to direct flow of the eluted materials to the sample cell, and 42f is positioned to close the outlet of column 36f during sampling. Valves 42a through 42f are shown schematically as three-way valves in their respective positions.

It may be desirable in the operation and construction of the foregoing described control systems to remove the samples from different points as experience and operating factors may dictate. For example, the sample streams for FIGURES 1 and 2 could be removed a few trays from the top of the columns in order to assure a vapor feed into the analyzer 36. Similarly, it may be desirable to control reflux ratio instead of steam. If this is done, the controllers 28 and 28' would be reset by the signal from recorder controller 64. Also, the recorder controller 64 may provide either electrical or pneumatic signals, as desired. In the embodiment shown, electrical signals are employed.

In FIGURES 1 and 2 various control valves, flow and liquid level controllers, and pressure controllers, and the like have been omitted because these are, by and large, well known in the art and not necessary towards an illustration or explanation of the invention involved herein.

Figure 3:
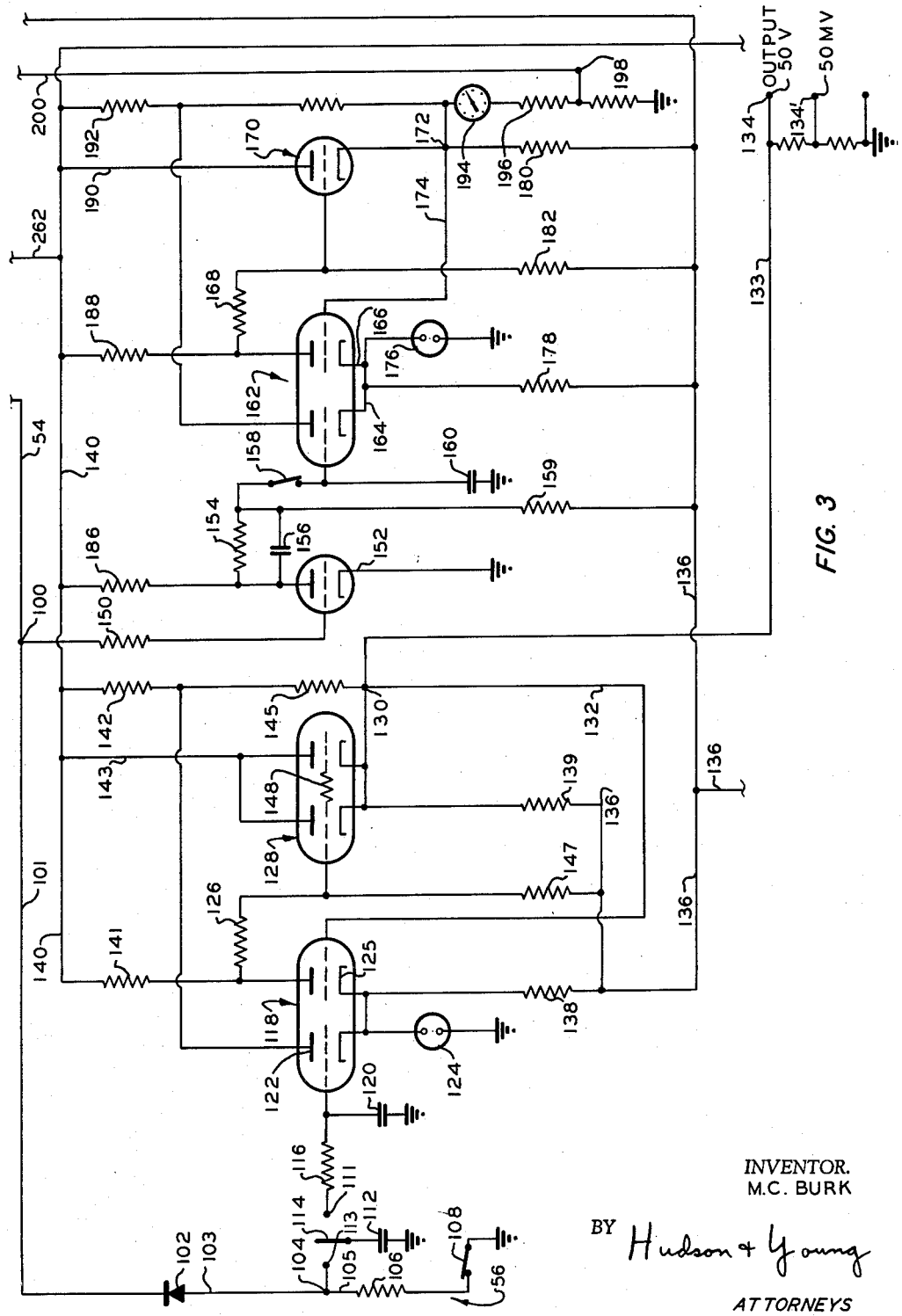
FIGURE 3 shows a cooperative arrangement of a single peak reader and an automatic zero apparatus.

In FIGURE 3 the output signal from the amplifier 50 appears on the lead 54 and is transmitted to the common input terminal 100 of the automatic zero and peak reader assembly 56. From this terminal a lead 101 conducts signals to the peak reader—and conducts them first to a rectifier (or diode as in my copending case) 102. A lead 103 connects the other terminal of the rectifier to a junction 104. A lead 105 connects the junction to a resistor 106, the other terminal of which is connected to ground or other suitable source of potential through a reset switch 108.

A double acting switch 114 is disposed for operation between contacts 111 and 113. A capacitor 112 is connected at one terminal to the switch 114 and at the other terminal thereof to ground. One terminal of resistor 116 is connected to contact 111 and the other terminal of 116 is connected to the input terminal of a different amplifier 118. A memory circuit comprising a second capacitor 120 is connected between this input of the amplifier and ground.

The control grid of a cathode follower 122 comprises the input terminal of the differential amplifier 118. The cathode of this cathode follower is connected by a voltage regulator 124 (a neon tube or the like) to ground and is also connected to the cathode of a triode 125. The anode of 125 is connected through a resistor 126 to the control grid of a power stage triode 128. In the embodiment shown a double triode is provided, although, if desired, a single triode may be employed. This power stage is also a cathode follower and its output appears at the junction 130. A feedback circuit through lead 132 connects junction 130 to the control grid of the triode 125. A lead 133 connects the junction 130 to the output terminals 134 of the differential amplifier. If desired, the output signal can be attenuated by appropriate resistors and applied through similar terminals 134'. The larger output signal is desired for pneumatic controllers whereas the smaller one is desired for electrical controllers. A lead 136 provides negative rectified D.C. to the cathodes of the triodes 122, 125 and cathode follower 128 through the resistors 138 and 139. A lead 140 provides positive voltage to the anode of triodes 125 and 122 through respective resistors 141 and 142. A lead 143 applies voltage to the anodes of the cathode follower 128. A resistor 145 is disposed between the resistor 142 and the junction 130. A resistor 147 is disposed between the lead 136 and the control grid of cathode follower 128. A resistor 148 is disposed betweeen the respective control grids.

The zeroing circuit comprises a resistor 150 that connects the input terminal 100 to a phase inverter 152. The anode of the phase inverter is connected through parallel connected resistor 154 and capacitor 156 to a normally open switch 158. A resistor 159 cooperates with 154 to form a voltage divider and permits the charge on 160 to reduce itself to the level of the phase inverter when the charge is greater than the inverter output. The switch 158 is connected to a capacitor 160 which comprises the memory unit of the zero circuit. The voltage stored on the capacitor 160 is applied to the differential amplifier 162 which is similar to 118.

The differential amplifier comprises an input terminal at the grid of a cathode follower 164, the output of which is connected to a triode 166. The output of the triode 166 is applied through a resistor 168 to the control grid of another cathode follower 170 (which could be a double triode such as 128 and 118). The output from 170 appears at a junction 172. A feedback circuit through lead 174 applies the output signal to the control grid of the triode 166. A neon tube voltage regulator 176 is connected between ground and the cathodes of 164 and 166.

Negative bias is applied to the cathodes of 164 and 166 from the lead 136 through the resistor 178. Similarly negative bias is applied to the cathode of 170 through the resistor 180. Resistor 182 connects the control grid of 170 to the lead 136. Positive voltage, derived from rectified alternating current, is applied to the anodes of the phase inverter and the differential amplifier through resistors 186 and 188. A lead 190 provides anode voltage to the cathode follower 170. Positive voltage is suppleid to the anode of cathode follower 164 across a resistor 192.

The output of the zero circuit is applied from junction 172 to one terminal of the galvanometer 194, thence through a resistor 196 to an output terminal 198. The signal appearing at 198 is then applied to the bias terminal of the bridge to automatically zero it as hereinafter described with reference to FIGURE 4. A lead 200 connects the output terminal 198 of the automatic zero circuit to the bridge 44.

In lieu of 152, a phase-reversing amplifier could be used in combination with the switch and memory of this zero circuit. However, the number of circuit elements between the memory (capacitor 160) and the bridge would be increased and thus gives poorer stability than the instant arrangement.

Figure 4:
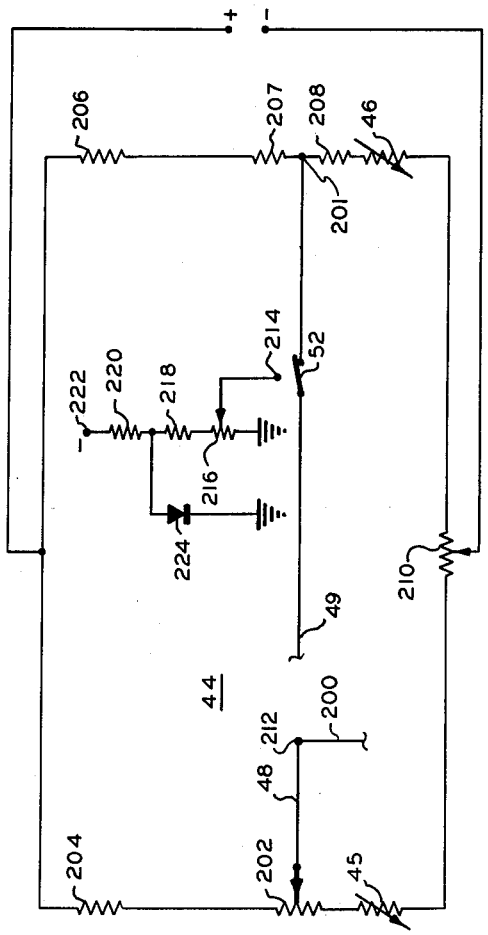
FIGURE 4 shows a Wheatstone bridge which is zeroed by the instant zero apparatus.

In FIGURE 4 there is shown a bridge of the type associated with the instant invention. In addition to the elements 45, 46, and leads 48, 49 which have already been enumerated, the bridge includes an output terminal 201, a manually operated voltage divider 202 and a resistor 204 in series with the thermistor 45 and disposed therebetween with the positive terminal of the bridge. A resistor 206, preferably of the same size as 204, and balancing resistors 207 and 208 are disposed in series between the positive terminal of the bridge and the thermistor 46. A voltage divider 210 is provided at the negative terminal of the bridge. Terminal 201 and switch 52 are shown disposed in the lead 49 which eventually connects to the amplifier 50. A bias terminal 212 is provided in lead 48 to which the lead 200 from the automatic zero circuit connects. This bias terminal, for all practical purposes, comprises an additional input to the bridge so that the bridge is biased back into balance rather than having a voltage divider positioned by a servomotor responsive to unbalance, as is shown in my copending application, Serial No. 727,606.

Figure 5A:
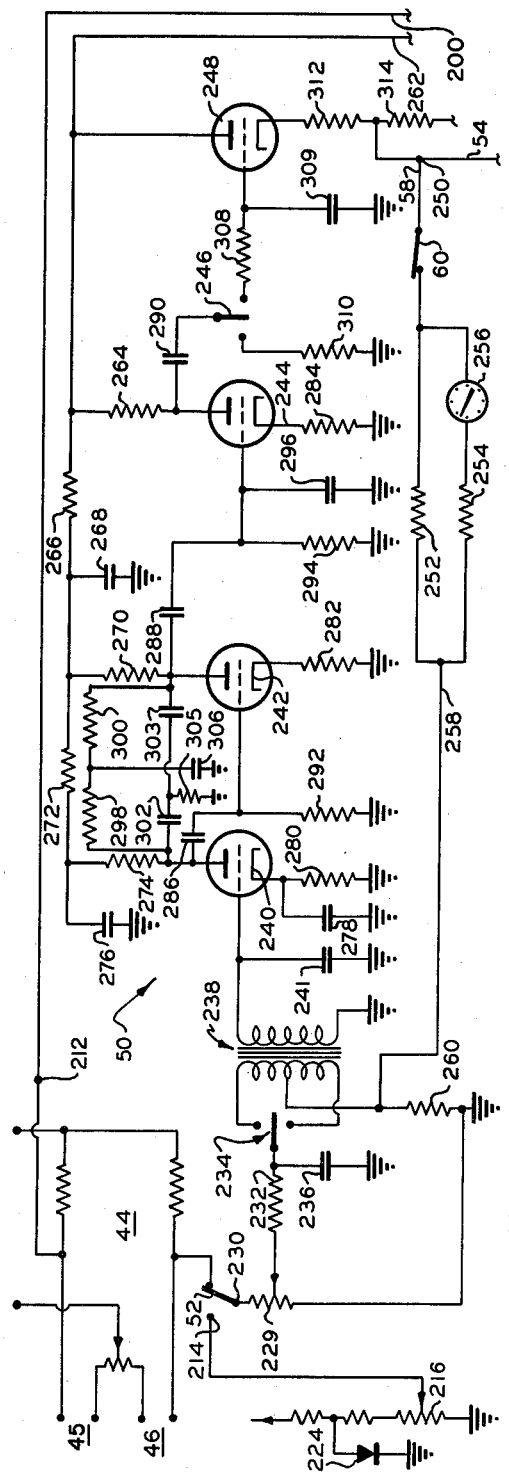
FIGURE 5A shows schematically an amplifier suitable for use with the instant invention.

In FIGURES 4 and 5A there is also shown a circuit arranged for cooperation with switch 52 to enable manual adjustment of the bridge span. In this circuit, a potentiometer contactor 214 is arranged to connect with the switch 52 (the latter being a double throw switch). Contactor 214 is a part of the potentiometer 216 which is arranged in series with resistors 218 and 220 and a source of negative potential 222. A Zener diode 224 is connected between the resistors 218 and 220 and ground. The switch 52 is normally closed, maintaining the lead 49 connected to the bridge terminal 201. In order to adjust the bridge span, the switch 52 is moved into contact with 214, then the original measurement (e.g. analysis) is set on potentiometer 216. The desired reading is then set on potentiometer 229. The span is now adjusted. This arrangement permits synthesizing a peak signal so that adjustments can be made during operation.

In FIGURE 5A are shown the details of an amplifier 50, such as used in the combination shown in FIGURES 1, 2, 6, and 10. An adjustable resistor 229 is disposed between the amplifier input terminal 230 (connected to bridge terminal 201 through lead 49) and ground. The resistor contactor is connected in series with another resistor 232 which is in turn connected in series with a chopper 234. A capacitor 236 is disposed between the latter two elements and ground. It must be remembered that a D.C. signal is supplied from the bridge, therefore, it is desired to chop in order that transforming and further amplification can take place efficiently. After the chopper is a transformer 238, the secondary of which is connected between ground and the control grid of a triode 240, this grid being grounded through a capacitor 241. The anode of 240 is connected to the control grid of a second triode 242, and similarly 242 is connected to a third triode 244. The output from 244 is connected to a chopper 246, which is, in turn connected in series with a power stage tube 248. Tube 248 is a cathode follower, the output of which appears at the amplifier output terminal 250. The lead 54 is connected to the output terminal 250 and conducts the amplified bridge signal to the peak reader and the zero circuit input terminal 100. The feedback circuit 53 (FIGURES 1, 2) is also provided, and has therein the resistor 252 connected in parallel with the series circuit of another resistor 254 and the galvanometer 256. A lead 258 connects the normally closed switch 60 and parallel circuit of the feedback to the primary of the transformer 238. A resistor 260 connects the primary of the transformer to ground.

A lead 262 is connected to a lead 140 which, as above explained, is connected to a source of positive potential. Lead 262 applies positive voltage to the anode of tube 248, and through the resistor 264 to the anode of the tube 244. Resistor 266 drops the potential to a lower value to be applied to triode 242. Condenser 268 is a decoupling condenser to prevent one tube from feeding another through the plates. Similarly, after passing through a resistor 272 the positive voltage is then applied through a resistor 274 to the anode of the triode 240. A decoupling condenser 276 connects the plate circuit of tube 240 to ground. A parallel circuit comprising a capacitor 278 and a resistor 280 connects the cathode of 240 to ground. Resistors 282 and 284 connect the cathodes of triodes 242 and 244, respectively to ground. Capacitors 286, 288 and 290 are disposed in series between the outputs of tubes 240, 242, and 244, respectively, and the next succeeding item of equipment. A resistor 292 connects the control grid of the triode 242 to ground. An RC circuit comprising a resistor 294 and a capacitor 296, connected in parallel with each other, connects the control grid of the tube 244 to ground. When I refer to ground I also mean a suitable source of potential.

A band elimination circuit is disposed between the anodes of tubes 240 and 242. This circuit is designed to reject noise which may appear through the ground connections and is described in FIGURE 4 of U.S. Patent 2,833,928. It aids in giving maximum amplification. The band elimination circuit comprises a resistor 298 connected in series with a resistor 300 and a capacitor 302 connected in series with a capacitor 303. The respective series connections are arranged in parallel with each other. A resistor 305 is connected between ground and a junction disposed between the capacitors 302 and 303. A capacitor 306 is connected between ground and a junction between the resistors 298 and 300.

An RC filter comprising a resistor 308 and the capacitor 309 is disposed in series between one contactor of the chopper 246 and the power stage 248. The other contact of the chopper is connected to ground through a resistor 310. A resistor 312 is disposed between cathode follower 248, which is the power stage and the output terminal 250. Having a common junction with 312 and 250 is a resistor 314 which is connected to a source of negative potential to bias the tube 248.

Figure 5B:
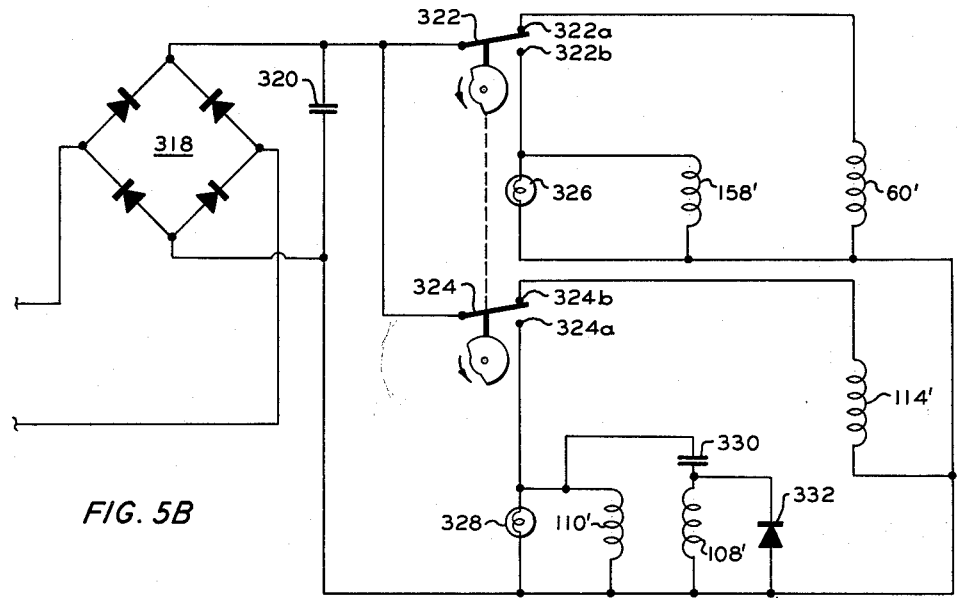
FIGURE 5B shows schematically the zero and gate control circuits for use with a single peak reader.

FIGURE 5B illustrates the power supply in the form of zero and gate actuating circuits. In substance, these circuits comprise two parallel circuits each actuated by their own timer operated cam. In FIGURE 5B prime numbers represent the elements which actuate those with like numbers in previously described figures. A separate cam, or cams if plural columns are used provide power to the sampling valves 34, as illustrated in FIGURES 1 and 2. The sampling valves 34 (and individual vent valves, FIGURES 2 and 6), as shown in these figures, each require a separate cam. Preferably the cams are mounted on a shaft that is rotated by a synchronous motor.

In FIGURE 5B a rectifier 318 has a capacitor 320 connected cross its output terminals. Transformed A.C. from the cathode heater circuit is applied to the input terminals. One lead of the rectifier is connected to timer operated switch contactors 322 and 324, both of which operate between two contacts. In the zero circuit a coil 60', for opening the switch 60 of FIGURES 1 and 2, is connected in series with the contact 322a. The other side of 60' is connected to the rectifier. Also in the zero circuit a coil 158' for closing switch 158 (FIGURE 3) and an indicating light 326 are connected in parallel between the contact 322b and the rectifier. In series with the contact 324b is a coil 114' for actuating the switch 114 of FIGURE 3. In series with the contact 324a is a parallel circuit comprising an indicating light 328, a relay coil 110', and a capacitor 330 connected in series with a relay coil 108'. A rectifier 332 is connected between the capacitor 330 and in parallel with the coil 108'.

Figure 6:
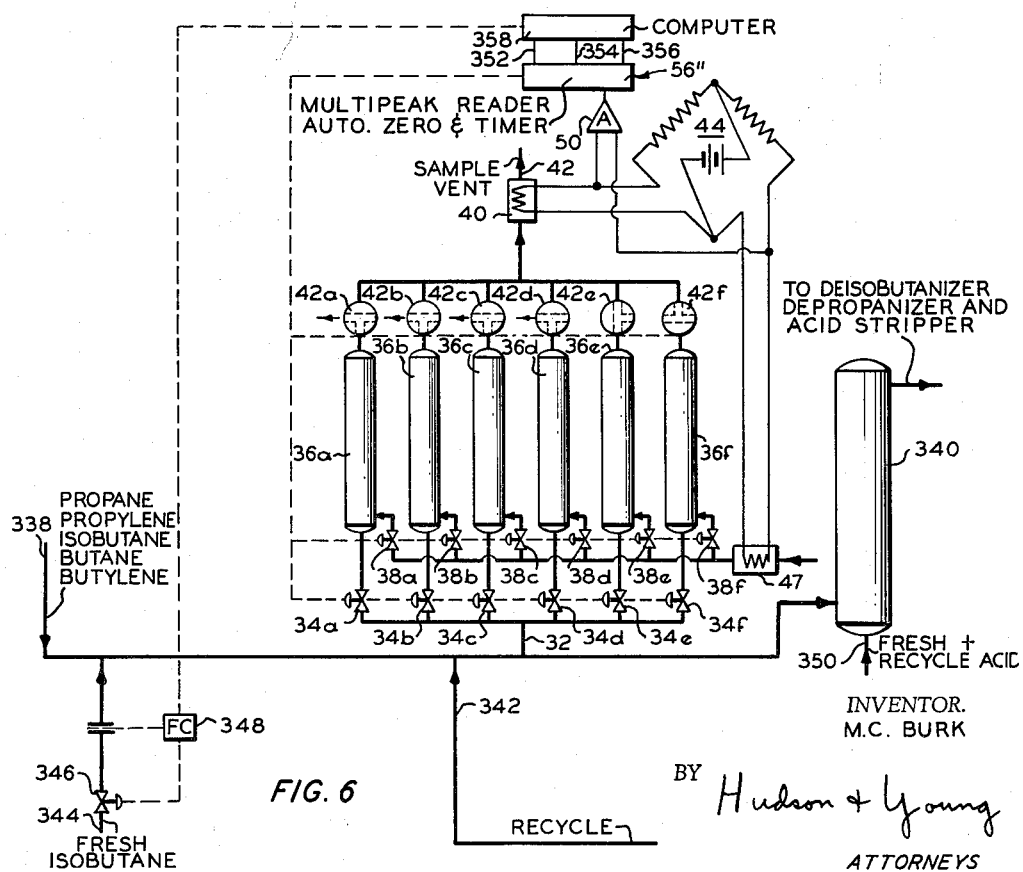
FIGURE 6 shows schematically a multiple peak reader as applied to a control of a process.

FIGURE 6 shows the instant invention in combination with the computer for controlling a feed stream to an alkylation unit, specifically, controlling make-up isobutane responsive to the ratio of total isobutane to olefins in the total feed. In this embodiment, a peak reader capable of reading a succession of multiple peaks is provided. This peak reader transmits its signals to a computer which, in turn, operates to control the feed. To avoid prolixity in the case, a full description of the complete alkylation process shown in FIGURE 6, is set forth in application, Serial No. 624,843, filed November 28, 1956, by D. E. Berger, entitled "Process Control System," now Patent No. 3,002,818. In substance, this process embodies supplying a feed stream comprising principally olefins and paraffins, adding thereto a recycle stream of isobutane, and supplying such fresh or makeup isobutane as may be necessary. This mixture of hydrocarbons is then contacted with anhydrous hydrofluoric acid which acts as a catalyst to form an alkylate. The mixture is then removed from the contacting chamber and fractionated in succession in a deisobutanizer (alkylate and normal butane removed as product, some overhead isobutane recycled, balance of overhead as feed to depropanizer), a depropanizer (propane overhead as feed to acid stripper, isobutane from kettle to recycle), and an acid stripper (propane out kettle, and acid overhead). Recycled isobutane and acid are derived from the appropriate portions of the equipment downstream of the contact chamber.

In FIGURE 6 a mixture of olefins and paraffins comprising propane, propylene, isobutane, butane, and butylene is fed through conduit 338 to contacting chamber 340. Isobutane is recycled from the deisobutanizer and depropanizer through conduit 342 and added to the feed to 340. Make-up isobutane is added through the conduit 344 which has therein a motor valve 346 and a flow controller 348. Fresh and recycle acid are added through a conduit 350. The chromatographic analyzer and peak reader are arranged substantially as shown in FIGURE 2 and, for that reason, are denoted by like reference numerals. It may not be necessary to provide plural columns. However, the cycle of each column is sample, elute, flush. Flushing and elution may take considerable time with certain mixtures and necessitate plural columns. This would be especially true when the first or last peak which is read is not the first or last peak eluted, e.g., propylene in the example shown. This varies with column packing and the sample.

A sample stream of the total feed is withdrawn from the conduit 338 downstream of the addition points of the fresh and recycle isobutane. This passes through the conduit 32 into the sampling valve manifolding. The multiple peak reader 56″ reads out the appropriate peaks and transmits them through leads 352, 354, and 356 to the computer 358. The computer then goes through its appropriate operation and supplies the control signal to the flow controller 348. The latter is reset, if necessary, by this control signal.

FIGURE 7 shows one embodiment of a computer suitable for use in the system of FIGURE 6. It is desired to maintain a ratio between isobutane and olefins fed into the contactor 340. The computer is arranged to compute this ratio by summing the olefins and dividing the sum by the isobutane, then to supply this ratio as a control signal to the flow controller. As shown, the peaks representing propylene, butylene, and isobutane are supplied through leads 352, 354, and 356, respectively, to the terminals 360, 362 and 364. Resistors 366 and 368 are of equal size and connect their respective terminals to a common junction 370 to form a summing circuit. Junction 370 is connected to a servoamplifier 372 which operates a servomotor 374 to provide an output representative of the olefin/isobutane ratio. A dividing circuit is formed of an amplifier 376 and a potentiometer 378 is connected in series to the terminal 364. A lead 379 feeds back to the amplifier 372 from the contactor of the potentiometer 378. A telemetering potentiometer 380, driven by the servomotor provides a signal representing the ratio to the output terminal 390. The signal is supplied from the output terminal to the flow controller to reset the same.

FIGURE 8 illustrates schematically the arrangement of apparatus for a multiple point peak reader 56″ as is shown in FIGURE 6. In describing FIGURE 8, like numbers will refer to like elements as shown in FIGURES 3 and 4. For the sake of simplicity a repetition of description of certain elements will not be given.

By and large, the multiple peak reader is quite similar to the single peak reader of FIGURE 3, since it incorporates many of the basic elements. The multiple peak reader includes an automatic zero circuit identical to that of FIGURE 3, a reset circuit and differs from that of FIGURE 3 by having timer control switches to properly select an attenuator for attenuating means to provide a signal representative of each peak that is of the proper magnitude to the amplifier 50. If the peaks should happen to be of the same general height, this feature may be eliminated. Another difference is that the memory circuit is larger and includes timer controlled switches which select the particular part of the memory circuit which is to capture and read out a peak and provide it to the computer of FIGURE 7.

Beginning at the left side of FIGURE 8 there are shown the input terminals which provide means for connecting the apparatus to the bridge. Next is provided the attenuator selector circuit which is in series between the input terminals and the amplifier 50. The selector switches comprise a number of parallel arranged voltage dividers each having a selector switch in series therewith. The selector switch 400 is designed for operation when the zero circuit is to compensate the bridge. Therefore, no attenuation is provided since it is not necessary in this embodiment. However, the various peaks in the embodiment described—those for propylene, butylene and isobutane, must be attenuated before passing to the amplifier. In some cases, attenuation may not be necessary, in which case a single timer operaed switch, such as 110 of FIGURE 3 is provided. The switches numbered 401, 402, 403 and 404, are operated by a timer in a predetermined sequence. Each of them in sequence makes a connection through its respective voltage divider 391, 392, 393 and 394. Although the example requires only three peaks to be passed, an extra attenuating circuit and memory circuit has been provided to demonstrate the flexibility of the system. The timer can be adjusted to prevent passing a signal through the switch 404 and 404a.

After the amplifier there is shown the input terminal 100 which is common to both the zero circuit and the peak reading and memory circuits. The zero circuit, as has been previously stated, is identical to that shown in FIGURE 3. The rectifier 102, capacitor 112, and reset means 106 and 108 are provided and operate in the same manner as described with respect to FIGURE 3. The switches 400 through 404, taken individually constitute the equivalent in FIGURE 3 of the switch 114a as it coacts with 104. The switch 114′ and resistor 116 are also provided in series with the memory circuits.

The memory circuit comprises a plurality of timer operated memory selector switches 401a, 402a, 403a and 404a. Between each switch and amplifier 118a, 118b, 118c and 118d is disposed a capacitor 120a, b, c and d. The capacitor 120 and amplifier 118, as shown in FIGURE 8, serve the same function as those of like number in FIGURE 3. Each memory circuit has its own terminal 134a, b, c and d as shown.

The zero actuating circuit and timing means therefor are arranged for the apparatus of FIGURE 8 as shown for the zero circuit of FIGURE 5B. The gate circuit for actuating the respective attenuators and memory circuits is a variation of that shown in FIGURE 5B.

The operation of the apparatus of FIGURE 1 will now be described. It is assumed that a feed stream such as natural gas liquids is supplied to the tower through column 12 and an overhead product stream is obtained therefrom which passes out through the conduit 30. Steam is being supplied through the conduit 70 under the control of the valve 68. Switch 52 is closed to complete the bridge-amplifier circuit. In summary, the timer opens the sampling valve 34 for a predetermined time and permits a measured sample of a given size to be placed in the column 36. If required, the timer then admits carrier gas through the conduit 38 into the column and it begins to elute the components of the sample. The bridge is unbalanced by the changes in the resistance of the thermistors 45 and 46 responsive to changes in the respective fluids flowing past them. Primarily, the changes in resistance 45 produce the peaks which represent the various components of the mixture, such as propane, butane, and isopentane.

Referring now to FIGURES 3, 5A and 5B, the first (or last, as shown in my copending application Serial No. 727,606) operation to take place in the peak reader is the zeroing of the bridge. This should take place at a time when no component within the column is being eluted, but while carrier gas is admitted. The timer moves the contact 322 against contact 322b which causes the switch 60 to open and the switch 158 to close. If there is unbalance in the bridge the signal is applied to the amplifier 50 appearing thereat at terminal 230 where it is then chopped, amplified and again chopped and applied to the input terminal 100 of the zero circuit. This signal represents unbalance in the bridge and is then applied to the control grid of the phase inverter 152. The signal out of 152 then passes through the differential amplifier 162 and appears at the output terminal 198 of the zero circuit where the signal is of opposite polarity and of a substantially equal magnitude to the signal appearing at the input terminal of amplifier 50.

This bridge-biasing signal is then applied to the bias terminal 212 of the bridge, as shown in FIGURE 4. This should rebalance the bridge so that there is no substantial unbalance sensed in it. The memory circuit 160 (FIGURE 3) continuously supplies a balancing bias to the bridge. If the bridge has become so unbalanced that manual balancing is necessary, this will be indicated on the galvanometer 194 of FIGURE 3 and the operator can then adjust the voltage divider 202 to appropriately compensate for this. The effect of manual adjustment, of course, is to reduce the magnitude of the unbalance in the bridge, hence the magnitude of the biasing signal applied thereto from the zero circuit. The reason I use the terms "substantially equal magnitude" and "no substantial unbalance" is in recognition that manufacturing tolerances and aging of circuit elements in service may prevent 100 percent bridge balance, the same as it would in any system, and the system characteristic that requires unbalance to operate, thereby to approach zero, but not to reach zero in order to maintain the necessary unbalance to operate.

Now that the bridge is zeroed the timer moves the switch 322 against the contact 322a, returns the switch 60 to closed position, opens 158, and thus prepares the circuit for reading out a peak. In the depropanizer of FIGURE 1, for example, having the chromatographic analyzer sensitized for reading out the peak of isopentane, when the isopentane peak is about to appear, the timer moves the contactor 324 (FIGURE 5B) against the contact 324a to thereby open the gate. When this occurs current passes through the coil 110′ and almost simultaneously therewith the capacitor 330 charges, thus actuating the coil 108′. The effect of these events is to connect switch 114 to terminal 113 and close the reset switch 108, the latter momentarily. The momentary closing of 108 allows discharging of the capacitor 112 of FIGURE 3, thus "erasing" any charge stored thereon, and permitting it to build up a completely new charge from the new signal being applied thereto. While the peak is being generated, a signal is passed and a charge is built up on capacitor 112.

When the maximum point of the peak passes, the charge of 112 prevents any further signal from passing the rectifier 102, and the rectifier will not permit leaking of the charge on 112 back into the circuit. At some time after the maximum charge has been stored in 112 the timer moves the contactor 324 against 324b which actuates the switch 114 from contact 113 to contact 111. When the switch 114 is connected to contact 111, the charge is transferred from the capacitor 112 to the memory circuit, that is, the capacitor 120. The charge on 120 is then applied to the differential amplifier 118, the output signal of which appears at terminal 134 or 134′, as the case may be. The output signal is then transmitted on lead 62 (FIGURE 1) to the recorder controller 64 which produces an output signal, either pneumatic or electrical which is applied to the flow controller 66. The flow controller is reset responsive to this and the motor valve 68 moves to a new control position. In the preferred embodiment, if too much isopentane appears, as indicated by the peak, the amount of steam is cut back. Since the timer is a continuously operating device, such as a synchronous motor driving the cams, the above steps are repeated.

The operation of the apparatus shown in FIGURE 2 is substantially the same as that of FIGURE 1, although it is for a different separation, e.g., producing a high purity ethylene with a very low concentration of carbon monoxide. The principal difference between the two is that FIGURE 2 has a plurality of columns 36a through 36f and the timer must sequentially operate the sampling valves 34a through 34f, carrier gas valves 38a through 38f, and vent valves 42a through 42f to admit, vent, and/or elute samples to each column in a preselected sequence. The plural columns are desired where the concentration of the measured component is low (FIGURE 2), or where elution takes a considerable time. A complete cycle of events for FIGURE 2 would include those for FIGURE 1 being repeated six times for the peak reader and one time for each column 36a through 36f.

In the operation of the apparatus of FIGURE 6, as previously explained, the feed streams are directed to the reactor of an alkylation unit which produces a mixture of normal butane and alkylate. In this process it is desired to control the amount of fresh isobutane in accordance with the ratio of isobutane to olefins being supplied in the feed to the reactor. FIGURE 6 shows a multicolumn multiple peak reader. However, if it is not desired to use a plural column chromatographic analyzer, a single column analyzer may be used if time is not of the essence. Initially, the timer can zero the bridge associated with the apparatus, as described with respect to FIGURE 1. In the zeroing operation the timer closes the switch 400 which is not connected in series with an attenuator, thereby passing an unattenuated signal to the amplifier 50 prior to passing to the zero circuit.

After the bridge has been zeroed the timer then opens one of the valves 34, for example 34a and positions the vent valve 42a for sampling (position of 42f). The valves remain thus for a predetermined length of time, thus placing a standard size sample in the column 36a. Next, valve 42a is moved to its eluting position by the timer (position of 42e). Of course, if a single column is used, there is no necessity for moving the valve 42, there being none.

Referring now to FIGURE 8, just before the first peak, which it is desired to read in the series of peaks generated from a single sample, the timer will close a selected one of the attenuator switches and will also close a selected one of the memory selector switches. In the embodiment shown, the timer will first close attenuator switch 401 and selector switch 401a. As the peak is generated, a charge is stored on 112 in like manner as explained with respect to FIGURE 1. At the end of this peak the switch 401 is opened and the transfer switch 114a is closed transferring the charge from capacitor 112 to the memory circuit 120a through the selector switch 401a. The signal from 120a is thus impressed on the differential amplifier 118a, which produces an output signal that appears at terminal 134a where it is transmitted to the computer 358, as shown in detail in FIGURE 7.

In the next operation the timer opens the switch 401a and it closes switches 402 and 402a thus permitting a charge to be stored on 112 once again but also permitting the previous charge on 112 to be erased prior to charging. The charge in 112 is next transferred by the closing of transfer switch 114a by the timer and is stored on capacitor 120b. The operation is repeated for as many peaks as it is desired to read. Although in the embodiment shown, only three peaks were necessary—mainly those for propylene, butylene, and isobutane, a total of four attenuating and memory circuits were provided to demonstrate that the system can have additional circuitry supplied in order to have greater flexibility.

It is desired to divide the signal appearing at terminal 134c by the sum of the signals at 134a and 134b. The latter signals are transmitted over respective leads to input terminals of a summing circuit which includes the resistors 366 and 368. The sum of these two olefins appears electrically at 370 where it causes the motor 374 to move an appropriate amount to adjust the contactor 380. When this adjustment is made, a new ratio for olefins to isobutane appears at the output terminal 390. Meanwhile, the signal for isobutane appears at terminal 364 of the computer circuit where it is applied to the multiplying circuit or potentiometer 378.

It should be noted in the operation of this computer that since the respective peaks appear at times when the other peaks have not yet changed that a digitalized or gradual type of signal change is achieved at the terminal 390. If desired, appropriate switching apparatus can be provided to prevent applying the computer output signal at 390 to a control mechanism until such times as a complete series of peaks has been read. This may, in some instances, prevent hunting of the control. In other instances, as here, hunting is not a serious problem and a gradual change may take place as each new peak is read in to the computer.

Returning now to FIGURE 6, the output signal from the computer 358 is transmitted to the flow controller 348 which is reset responsive thereto and thereby moves the motor valve 346 to a new position. This, in turn, adjusts the flow of makeup isobutane into the system.

In the above operation of FIGURE 6, the column is 30 feet long and is packed with crushed fire brick (e.g., Johns-Manville No. C-22 fire brick) which is wetted with a mixture of 70 parts by weight of silicone oil (Dow-Corning 200 centipoises) and 30 parts by weight dimethyl sulfolane. The order of elution of materials in the sample stream is the order in which the components are listed for the feed stream in FIGURE 6.

It should be evident that the instant invention includes a greatly simplified peak reader having the advantage of fewer moving parts as is exemplified by the fact that the timer necessary to operate FIGURE 1 only needs three cams—one cam for operating the valve, the zero circuit (FIGURE 5B) and the gate circuit (FIGURE 5B), respectively. In the preferred construction, all of the switches (e.g., 60, 108, 110, 114, 158) used were of the type that close responsive to application of the magnetic field (or open if that is the operation desired). It has been found desirable to employ glass enclosed switches which are, in turn, surrounded by a coil (primed coils, FIGURE 5B) in order to provide a fireproof structure which is rapidly responsive to the application of actuating force.

In addition, a novel means for zeroing a Wheatstone bridge has been devised and presented herein. This zeroing or compensating means comprises apparatus which provides a signal of opposite polarity and substantially equal magnitude to bias the bridge in the opposite direction in which its unbalance appears. In addition, the instant invention presents an improved simplified structure capable of being associated with the high speed chromatographic analyzers which have been developed, as well as being associated with those which have been available for quite some time. In addition, this peak reader is suitable for use with chromatographic analyzers having a plurality of columns. In addition, a multipeak reader has been presented which is suitable for providing signals to a computer or to a ratio controller and which can, if desired, provide an apparent digitalized signal which will be especially useful in the case of chromatographic analyzer—peak reader—computer combinations. With obvious modifications, the various peak-reading and zero circuits of my copending case 727,606 can be employed in combination with any one or all of the instant peak, zero, and multiple-peak reading circuits.

It should now be evident from the foregoing that when used in combination with a computer or ratio controller, a multiple point peak reader is eminently suitable for controlling ratios or a multiplicity of other process variables as the situation should demand. For example, the apparatus could be used to control the ratio of carbon monoxide to carbon dioxide in the process illustrated in Patent No. 2,806,144. Likewise, in the separation of butadiene as illustrated in Patent No. 2,709,678, where acetylenes tend to build up in the middle of a fractionation column, such an analyzer could be used to determine acetylene in the presence of other materials and to compute the ratio of acetylene to other hydrocarbons. In such application the computed ratio, when it reaches critical limits, could be used to operate a side draw apparatus to remove the excess of acetylenes from the column.

Another application would be in the extractive distillation of butenes-2 from butene-1 using furfural. In this distillation the butenes-2 go overhead but it is desired to maintain a limitation on the amount of them that appear in the kettle product stream comprising butene-1. A multiple point chromatographic analyzer is applicable to determine the amount of butene-1 and to use the peak generated there to adjust the fufural rate or heat, as the case may be. However, because of the limitation on butenes-2 placed by specification it is necessary to also measure this component and when it exceeds the specification percentage, such as 4 percent, it then could be used to override or reset heat absorbent reflux or the like. Of course, impurities could be summed (as in FIGURE 7) and the control system made responsive to this sum.

While the instant peak reader has been shown suitable for use with a chromatographic analyzer, it is by no means limited thereto. It can be used in combination with any analyzing instrument that provides an intermittent signal representative of a component from which it is desired to control. Such devices include mass spectrometers, ionization detectors, and those types of infrared and ultraviolet analyzers that scan a region of wave lengths. Generally, such analyzers require individual samples, i.e. are not continuous; they provide an analysis which can indicate a plurality of components; and create the problem in using them for control that one part of the analysis must be separated from other parts so that the control system can be made responsive to the proper component.

While I have shown certain examples, combinations and embodiments in the attached drawings and described them in the attached specification, it is not my intention to be limited to the specific forms illustrated and discussed, but to include as my invention all those modifications thereto which should be obvious to one skilled in the art.

I claim:

1. A chromatographic analyzer comprising a plurality of chromatographic columns each having an inlet, an outlet and a connection to a source of carrier gas; a sample cell; means for selectively timing the admission of samples to the inlets of the respective columns so that only one column at a time receives a sample, for timing the admission of carrier gas through said connection to each respective column first in a flow for eluting the sample from one column after admission and next to a flow for flushing the column, and for directing a mixture of the carrier gas and eluted sample to said sample cell from the outlet of the column then subject to the carrier gas flow for eluting; a bridge having a branch in said sample cell and a pair of output terminals; a peak reader connected to said output terminals that comprises first means for storing voltages received from said output terminals; means connected between said first means and said bridge for terminating the storing on said first means when the maximum value of the stored signal occurs; second means for storing a signal transferred from said first means; third means connected to said first means for disconnecting said first means from said means for terminating while connecting said first means to said second means and vice versa; fourth means connected to said first means for removing a prior stored signal therefrom when said third means connects said first means to said means for terminating; means continuously connected to said second means for continuously producing an output signal in response to the signals stored on said second means; and means for operating said third means in a timed sequence thereby to maintain said first means disconnected from said means for terminating and to maintain said first means connected to said second means for a first interval of time, and then to reverse these connections for a second interval of time during the initial portion of which said fourth means removes any prior stored signal from said first means; said means for selectively timing and said means for operating both being operated in unison so that the flow of carrier gas for eluting is admitted to a selected column during said second interval of time and to admit the flow of carrier gas for flushing during said first interval of time.

2. A chromatographic analyzer comprising a plurality of chromatographic columns each having an inlet, an outlet and a connection to a source of carrier gas; a sample cell; means for selectively timing the admission of samples to the inlets of the respective columns so that only one column at a time receives a sample, for timing the admission of carrier gas through said connection to each respective column first in a flow for eluting the sample from one column after admission and next in a flow for flushing the column, and for directing a mixture of the carrier gas and eluted sample to said sample cell from the outlet of the column then subject to the carrier gas flow for eluting; a bridge having a branch in said sample cell and a pair of output terminals; a peak reader having a pair of input terminals connected to said bridge output terminals and further comprising a rectifier, a means for switching, a first capacitor having one terminal connected to said means for switching and another terminal connected to a source of potential, an amplifier having another input terminal, a second capacitor connected to said another input terminal for storing a signal applied thereto and for applying the signal to said another input terminal, and means for moving said means for switching to a first position and maintaining it there for a first predetermined interval and then moving said means for switching to a second position and maintaining it there for a second predetermined time interval, means for forming a series circuit of one of said input terminals and said rectifier and said means for switching in said first position; and means for forming a series circuit of said means for switching and said another input terminal in said second position.

3. A process control system comprising a chromatographic column having an inlet and an outlet; means for providing a sample to said inlet; an electrical network having an element disposed in a portion of said column outlet and also having output terminals; a multiple peak reader connected to output terminals and comprising a rectifier, first means for passing a signal to said rectifier, second means connected to said rectifier for storing the signal passed by said rectifier and for shutting off said rectifier when the stored signal reaches a maximum, third means connected to said second means for producing a signal representative of the maximum signal stored on said second means, a plurality of fourth means for storing the signal produced by said third means, fifth means connected to said third means for transferring the signal from said third means to one of said fourth means at predetermined times, and a plurality of sixth means, each one of which is disposed between said fifth and a respective one of said fourth means for individually connecting selected ones of said plurality of fourth means to said fifth means in a predetermined sequence; a means connected to said multiple peak reader for computing relationships between the signals stored in selected ones of said fourth means; and means responsive to the computation of the last-said means for adjusting a process variable.

4. A process control system comprising a chromatographic column having an inlet and an outlet; means for providing a sample to said inlet; an electrical network having an element disposed in a portion of said outlet of said column and also having an output terminal and a biasing terminal; a peak reader connected to said output terminal; a phase inverter; a capacitor having first and second terminals; means for connecting said phase inverter in series with said output terminal and said first terminal at first predetermined times and for breaking the series circuit at second predetermined times; means for continuously connecting said second terminal to a reference potential; and means for continuously connecting said first terminal to said biasing terminal.

5. A process control system comprising a chromatographic column having an inlet and an outlet; means for providing a sample to said inlet; a bridge having an element disposed in a portion of said outlet of said column and also having power supply terminals, first and second output terminals, and a biasing terminal disposed between said second output terminal and said bridge; a multiple peak reader connected to said first and second output terminals; a direct current power supply; means for connecting said power supply to said bridge power supply terminals; an amplifier having input terminals and an output terminal; a zero circuit comprising an input terminal, a phase inverter, a switch, a differential amplifier, and another output terminal connected in series with a capacitor connected on one side between the switch and the differential amplifier and on the other side to a source of potential; means for connecting said amplifier input terminals to said bridge output terminals; means for connecting said zero circuit input terminal to said amplifier output terminal; and means for continuously connecting said another output terminal to said biasing terminal.

6. A peak reader comprising first means for receiving and temporarily storing the maximum value of the received signal; second means for storing a signal received from said first means, means connected between said first and second means for transferring the stored signal from the first to the second means after the maximum signal has been stored on said first means; means for resetting said first means at the initial portion of the receiving of the signal thereby to erase any prior stored signal therefrom; means for continuously responding to the signal stored on said second means; and means for connecting said first means to a signal source and for operating said means for resetting to erase any prior signal stored on said second means before a signal above a predetermined level is received by said first means, and then for transfering the signal from said first means to said second means by operating said means for transferring, all in a predetermined time sequence.

7. The peak reader of claim 6 wherein said means for connecting comprises a first switch for passing a signal to said first means from a signal source, said means for transferring comprises a second switch, and timer means for closing and opening said switches in the aforesaid time sequence.

8. The peak reader of claim 6 wherein said means for continuously responding is a differential amplifier that comprises first and second cathode followers each having an anode, a cathode and control grid; a vacuum tube having an anode, cathode and control grid; an output terminal being connected to said second cathode follower cathode; a feed back circuit connected between said output terminal and said vacuum tube control grid; means for connecting said first cathode follower cathode to said vacuum tube cathode; means for connecting said vacuum tube anode to said second cathode follower control grid.

9. The combination comprising a bridge and a peak reader connected thereto for receiving, temporarily storing, and providing a continuous output signal that is representative of the maximum value of voltage received from said bridge in a predetermined time interval, said peak reader comprising first means for storing a received voltage; means connected between said first means and said bridge for terminating the storing on said first means when the maximum value of the stored signal occurs; second means for storing a signal transferred from said first means; third means connected to said first means for disconnecting said first means from said means for terminating while connecting said first means to said second means and vice versa; fourth means connected to said first means for removing a prior stored signal therefrom when said third means connects said first means to said means for terminating; means continuously connected to said second means for continuously producing an output signal in response to the signals stored on said second means; and means for operating said third means in a timed sequence thereby to maintain said first means disconnected from said means for terminating and maintain said first means connected to said second means for a first interval of time, and then to reverse these connections for a second interval of time during the initial portion of which said fourth means removes any prior stored signal from said first means.

10. The combination comprising a bridge having output terminals; a multiple peak reader; and means connected between said output terminals and said multiple peak reader for providing the latter with a signal representative of that appearing between said output terminals; said peak reader comprising a rectifier; a plurality of normally inoperative first means connected to said rectifier for passing a signal to said rectifier; second means connected to said rectifier for storing the signal passed by said rectifier and for shutting off said rectifier when the stored signal reaches a maximum; third means connected to said second means for producing a signal representative of the maximum signal stored on said second means; a plurality of fourth means for storing the signal produced by said third means; fifth means connected to said third means for transferring the signal from said third means to one of said fourth means at predetermined times; means for rendering individually operative selected ones of said first means in a first predetermined sequence of time intervals; and a plurality of means, all of which are connected to said fifth means and each one being connected to one of said fourth means, for connecting selected ones of said fourth means to said fifth means in said first predetermined sequence.

11. A multiple peak reader comprising a rectifier; a plurality of normally inoperative first means connected to said rectifier for passing signals to said rectifier; second means connected to said rectifier for storing the signal passed by said rectifier and for shutting off said rectifier when the stored signal reaches a maximum; third means connected to said second means for producing a signal representative of the maximum signal stored on said second means; fourth means for storing the signal produced by said third means; fifth means disposed between and connected to said third and fourth means for transferring the signal from said third means to said fourth means at predetermined times; and means for rendering operative selected ones of said first means in a predetermined sequence of time intervals.

12. The apparatus of claim 11 wherein said second means comprises a capacitor connected between said rectifier and a source of potential.

13. A multiple peak reader comprising a rectifier; first means for passing signal to said rectifier; second means connected to said rectifier for storing the signal passed by said rectifier and for shutting off said rectifier when the stored signal reaches a maximum; third means connected to said second means for producing a signal representative of the maximum signal stored on said second means; a plurality of fourth means for storing the signal produced by said third means; fifth means connected to said third means for transferring the signal from said third means to one of said fourth means at predetermined times; and a plurality of sixth means each one of which is disposed between said fifth and a respective one of said fourth means for individually connecting selected ones of said plurality of fourth means to said fifth means in a predetermined sequence.

14. The combination comprising a bridge having output terminals; a multiple peak reader; and means connected between said output terminals and said multiple peak reader for providing the latter with a signal representative of that appearing between said output terminals; said multiple peak reader comprising a rectifier; first means for passing a signal to said rectifier; second means connected to said rectifier for storing the signal passed by said rectifier and for shutting off said rectifier when the stored signal reaches a maximum; third means connected to said second means for producing a signal representative of the maximum signal stored on said second means; a plurality of fourth means for storing the signal produced by said third means; fifth means connected to said third means for transferring the signal from said third means to one of said fourth means at predetermined times; and a plurality of sixth means, each one of which is disposed between said fifth and a respective one of said fourth means, for individually connecting selected ones of said plurality of fourth means to said fifth means in a predetermined sequence.

15. A multiple peak reader comprising a rectifier; a plurality of normally inoperative first means connected to said rectifier for passing a signal to said rectifier; second means connected to said rectifier for storing the signal passed by said rectifier and for shutting off said rectifier when the stored signal reaches a maximum; third means connected to said second means for producing a signal representative of the maximum signal stored on said second means; a plurality of fourth means for storing the signal produced by said third means; fifth means connected to said third means for transferring the signal from said third means to one of said fourth means at predetermined times; means for rendering operative selected ones of said first means in a first predetermined sequence of time intervals; and a plurality of means, all of which are connected to said fifth means and each one being connected to one of said fourth means, for connecting selected ones of said fourth means to said fifth means in said first predetermined sequence.

References Cited in the file of this patent

UNITED STATES PATENTS

| 2,448,322 | Piety | Aug. 31, 1948 |
| 2,468,687 | Schmitt | Apr. 26, 1949 |
| 2,582,480 | Dimond | Jan. 15, 1952 |
| 2,768,347 | Hansen | Oct. 23, 1956 |
| 2,826,908 | Skarstrom | Mar. 18, 1958 |
| 2,833,469 | Groth | May 6, 1958 |
| 2,833,922 | Gerks | May 6, 1958 |
| 2,834,883 | Lukoff | May 13, 1958 |
| 2,899,258 | Spraklen | Aug. 11, 1959 |

FOREIGN PATENTS

| 539,501 | Great Britain | Sept. 12, 1941 |

OTHER REFERENCES

Article entitled "Analyzing Hydrocarbon Mixtures," from Oil and Gas Journal, by Podbielniak et al., April 16, 1956, pages 211–216, 73–23c.

Article entitled "Apparatus Requirements for Quantitative Application of Gas-Liquid Partition Chromatography," from Analytical Chemistry, by Dimbat et al., March 1956, pages 290–297, 733–23c.